July 14, 1931.  C. B. COLE ET AL  1,814,079

TOOL CARRYING HEAD

Filed Feb. 3, 1930

Inventors:
C. B. Cole
Otto Leroy Lewis
By: Jones, Addington, Ames & Seibold
Attys.

Patented July 14, 1931

1,814,079

UNITED STATES PATENT OFFICE

CHARLES B. COLE AND OTTO LEROY LEWIS, OF CHICAGO, ILLINOIS

TOOL CARRYING HEAD

Application filed February 3, 1930. Serial No. 425,386.

Our present invention relates to tool carrying heads in general such as are commonly used mounted on a boring bar, the boring bar being a part of or separate from the machine driving the bar. It also relates to such a head arranged to carry a power driven grinder or other special tool useful for enlarging or finishing the bore of cylinders.

Such tool carrying heads as at present constructed are usually lacking in rigidity and ease of adjustment of the cutting tool, the range of adjustment for large and small diameters being very limited. Among the objects of this invention are to secure rigidity, a wide range of adjustability, and easy, accurate adjustment of the cutting tool or grinder.

These objects we attain by means of the mechanism illustrated in the accompanying drawings, showing a preferred construction; the drawings forming a part of this specification, and in which—

Figure 1:
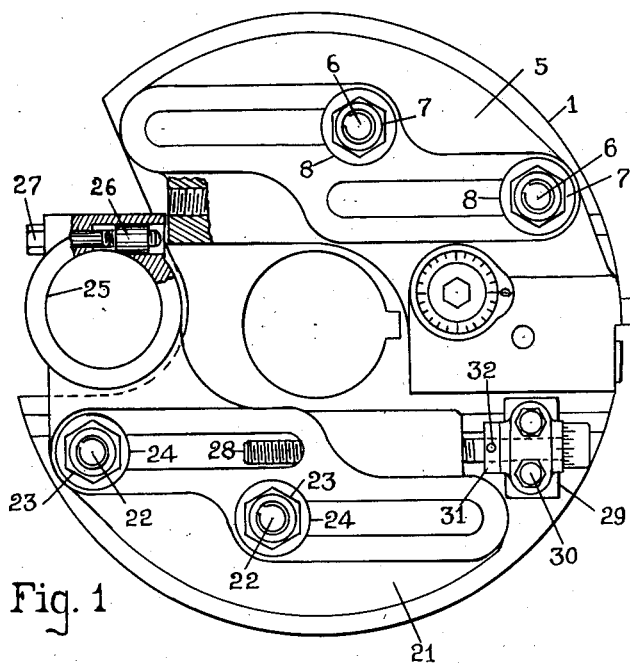
Figure 1 is a front view and Fig. 2 a side view of the assembled head.
Figure 2:
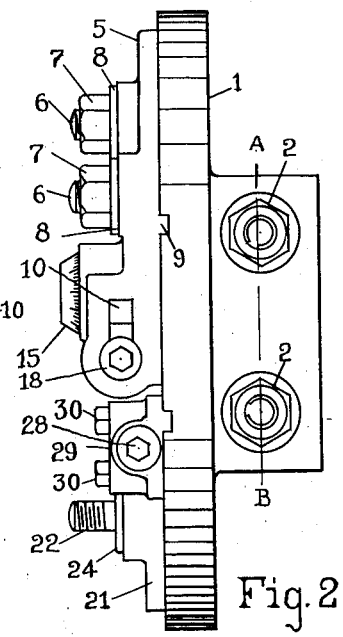
Figure 3:
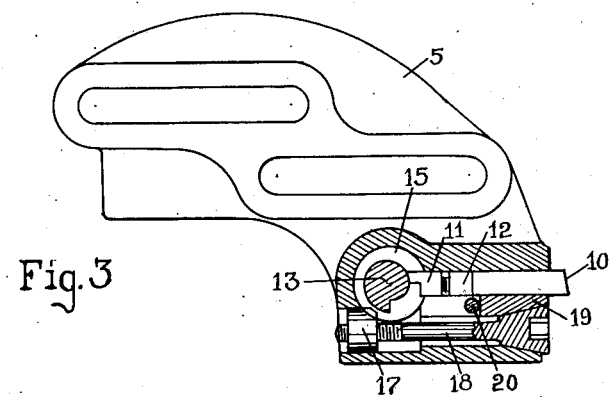
Fig. 3 is a view of the tool holder detached from the driving head, shown partly in section to disclose the tool holding and adjusting parts.
Figure 4:
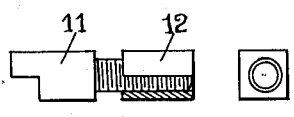
Fig. 4 is a view of the screw and nut used to back up the cutting tool.
Figure 5:
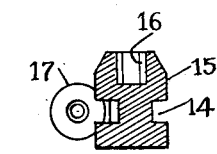
Fig. 5 is a sectional view of the graduated plug used to accurately adjust the cutting tool.
Figure 6:
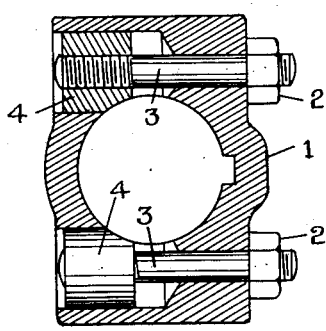
Fig. 6 is a sectional view taken on plane AB through the hub of the driving head.

Referring now to Figures 1 to 6, inclusive, the construction shown comprises a face plate 1 bored and keywayed for mounting on a boring bar such as shown and described in our co-pending application, Serial No. 425,385, filed February 3, 1930, machines for boring cylinders, or any other bar for which this head is a suitable tool carrying device.

The face plate 1 is clamped on the bar by tightening the nuts 2 on the studs 3 tightly screwed into the nuts 4 which have one corner rounded to form a seat against the bar.

The boring tool holder 5 is attached to the face plate 1 by the studs 6, nuts 7 and washers 8, the tool holder 5 being slotted to receive the studs so that it may be set out beyond the position shown on the face plate 1 for a considerable distance. It is provided with a tongue 9 fitting a groove in the face plate 1 to guide it laterally and take the thrust of the boring tool 10 supported in the tool holder 5 and backed up by the adjusting screw 11 and the adjusting screw nut 12, the adjusting screw 11 being supported endwise by the cam 13 at the bottom of the groove 14 in the adjusting plug 15 which is provided with a wrench socket 16 and graduations for facilitating setting.

The adjusting plug 15 is secured in the tool holder 5 by the nut 17 which has a tongue extending into the groove 14 of the adjusting plug 15 to secure the adjusting plug 15 endwise. The nut 17 also locks the adjusting plug 15 against rotation when the screw 18 is tightened; at the same time the tapered head on the screw 18 forces the wedge 19 over against the tool 10, securely locking the tool 10. The wedge 19 is supported endwise by the stop pin 20. The head of the screw 18 is provided with a socket for inserting a wrench. For setting the tool 10 for the desired depth or diameter of cut, the nuts 7 are loosened and the tool holder 5 is adjusted roughly to the approximate depth of cut by sliding the tool holder along the studs 6. The nuts 7 are then tightened up and the final adjustment is effected by means of the adjusting block 15 by which the cam 13 is rotated to secure precisely the right depth of cut. The screw 18 is then tightened up to force the wedge 19 tightly against the tool 10 and to draw the nut 17 snugly against the adjusting block 15 to hold it in adjusted position.

The face plate 1 is also provided with a movable head 21 similar to the boring tool holder 5, but arranged to carry the grinder mentioned in our co-pending application "Cylinder boring and grinding machine." The head 21 is tongued and grooved to the face plate 1 and clamped in position or given a light sliding tension by the studs 22, nuts 23 and washers 24. The grinder is gripped on a turned diameter fitting loosely the bore 25 of the head 21 by the nut 26 tightened by the cap screw 27.

The head 21 is tapped to receive the screw 28 which has a bearing in the bracket 29 securely fastened to the face plate 1 by the screws 30. The head of the screw 28 shoulders against the bracket 29 and is provided with the graduated dial and the wrench socket. The screw 28 is secured endwise by the collar 31 pinned to the screw 28 by the cross pin 32, the collar bearing against the face of the bracket 29. Since the bracket 29 is firmly secured to the face plate 1, when the nuts 23 are slightly loosened, the head 21 may be given a fine endwise adjustment by turning the screw 28, this adjustment being desirable to set the grinding wheel for grinding the required diameters.

The tool holder 5 is also tapped to receive the screw 28 and may be installed on the face plate instead of the head 21, or two tool holders 5 may be used simultaneously.

We realize that considerable departure might be had from the mechanism illustrated without departing from the spirit of this invention and, therefore, we desire that its scope shall not be limited to the details shown. We also realize that the tool carriers might be useful for carrying other devices in place of the grinder or boring tool. For example, a roller back-up or follower rest such as is commonly used in connection with turning tools on turret lathes might be installed in place of the grinder to secure greater rigidity and eliminate chatter. A burnishing roller might be used in the grinder holder. A power driven milling cutter might be installed in place of the grinder for internal milling or threading. We have in mind these and other applications as forming a part of this invention.

We claim:

1. A boring and grinding head, including a face plate driving member, means for locking said member on a boring bar, a tool holder mounted on the face plate in guided slidable relation, means for firmly fastening said tool holder to said face plate, a boring tool, an indexed cam rotatably supported by the tool holder and arranged to adjust the position of the boring tool, an adjustable spacer interposed between the cam and the boring tool, a floating wedge-shaped member supported endwise, a cone headed screw arranged to bring pressure against the wedge-shaped member, thereby clamping the boring tool, and a nut engaging said screw, supported in the tool holder, and provided with interlocking means between itself and the cam member.

2. In a boring and grinding head of the character described, a boring tool supported in a holder and provided with endwise adjustment by means of an indexed cam supported by the tool holder, an endwise supported floating member arranged to clamp the boring tool by pressure received from the head of a screw supported by the tool holder housing, a nut engaging said screw and supported by the tool holder housing, having a portion interlocking with the body of the cam and bearing against the cam to lock it in position when the boring tool is clamped by tightening the screw.

3. A boring and grinding head, including a face plate driving member, a member mounted in slidable guided relation upon the same, said member having a bore at one end for retaining a grinder or other tool, means for clamping said grinder or tool in the bore, a bracket member firmly secured to the face plate, a screw supported by said bracket and held against endwise movement in the bracket, said screw being threaded into the slidable member for endwise adjustment of said member, and a graduated dial upon said screw.

4. A boring head provided with a boring tool socket in which the tool is mounted for endwise adjustment, a cam mounted on said head for adjusting said tool, an elongated floating member held against endwise movement for clamping the tool in position, a screw having a tapering portion for engaging said floating member to press it against the tool, and a nut for said screw having a portion interlocking with the cam and bearing against the cam to lock it in position when the boring tool is clamped by tightening the screw.

In witness whereof, we have hereunto subscribed our names.

CHARLES B. COLE.
OTTO LEROY LEWIS.